(12) United States Patent
Ohwatari et al.

(10) Patent No.: US 9,294,977 B2
(45) Date of Patent: Mar. 22, 2016

(54) RADIO COMMUNICATION SYSTEM, RADIO BASE STATION, MOBILE COMMUNICATION TERMINAL, AND COMMUNICATION CONTROL METHOD

(71) Applicant: NTT DOCOMO, INC., Chiyoda-ku (JP)

(72) Inventors: Yusuke Ohwatari, Chiyoda-ku (JP); Nobuhiko Miki, Chiyoda-ku (JP); Yukihiko Okumura, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 134 days.

(21) Appl. No.: 14/353,884

(22) PCT Filed: Oct. 16, 2012

(86) PCT No.: PCT/JP2012/076714
§ 371 (c)(1),
(2) Date: Apr. 24, 2014

(87) PCT Pub. No.: WO2013/061828
PCT Pub. Date: May 2, 2013

(65) Prior Publication Data
US 2014/0314033 A1 Oct. 23, 2014

(30) Foreign Application Priority Data
Oct. 26, 2011 (JP) ................................ 2011-234694

(51) Int. Cl.
*H04W 16/32* (2009.01)
*H04W 36/08* (2009.01)
(Continued)

(52) U.S. Cl.
CPC .............. *H04W 36/08* (2013.01); *H04W 48/20* (2013.01); *H04W 16/32* (2013.01); *H04W 48/16* (2013.01); *H04W 84/045* (2013.01)

(58) Field of Classification Search
None
See application file for complete search history.

(56) References Cited

U.S. PATENT DOCUMENTS 6,173,014 B1  1/2001  Forssen et al.
7,142,861 B2  11/2006  Murai
(Continued)

FOREIGN PATENT DOCUMENTS

JP  2000-511370  8/2000
JP  2007-514367  5/2007
(Continued)

OTHER PUBLICATIONS

International Search Report issued Dec. 25, 2012, in PCT/JP12/076714 filed Oct. 16, 2012.
(Continued)

*Primary Examiner* — Kevin C Harper
*Assistant Examiner* — Derrick V Rose
(74) *Attorney, Agent, or Firm* — Oblon, McClelland, Maier & Neustadt, L.L.P.

(57) ABSTRACT

A radio communication system includes multiple radio base stations and multiple mobile communication terminals. Each mobile communication terminal measures a reception quality of radio waves from each radio base station. A first mobile communication terminal that can execute interference rejection combining offsets the reception quality value of radio waves from a second radio base station by using a first bias value. A second mobile communication terminal that cannot execute interference rejection combining offsets the reception quality value of radio waves from the second radio base station by using a second bias value that is lower than the first bias value. The first radio base station selects, as the radio access point for the mobile communication terminal, a radio base station corresponding to a reception quality value indicating a best reception quality among the first reception power value and the offset second reception power value.

14 Claims, 8 Drawing Sheets

(51) Int. Cl.
  *H04W 48/16* (2009.01)
  *H04W 48/20* (2009.01)
  *H04W 84/04* (2009.01)

(56) References Cited

U.S. PATENT DOCUMENTS

2007/0275722 A1  11/2007  Thorson et al.
2011/0244863 A1  10/2011  Matsuo et al.

FOREIGN PATENT DOCUMENTS

JP    2008-34914       2/2008
WO   WO 2010/070854 A1  6/2010

OTHER PUBLICATIONS

"Discussions on CRE bias", Pantech, 3GPP TSG RAN2 Meeting #73, R2-111293, Feb., 21-25, 2011, 4 pages.
"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.1.0, Mar. 2011, 290 pages.
"On TDM eICIC Performance with Different Receiver Models", Nokia Siemens Networks, Nokia, 3GPP TSG-RAN WG1, Meetings #66, R1-112382, Aug. 22-26, 2011, 7 pages.
"On advanced UE MMSE receiver modelling in system simulations", Nokia, Nokia Siemens Networks, 3GPP TSG RAN WG1 Meeting #64, R1-111031, Feb. 21-25, 2011, 10 pages.
"3rd Generation Partnership Project; Technical Specification Group Radio Access Network; Evolved Universal Terrestrial Radio Access (E-UTRA); Further advancements for E-UTRA physical layer aspects (Release 9)", 3GPP TR 36.814, V9.0.0, Mar. 2010, 104 pages.
Japanese Office Action issued Dec. 17, 2013 in Japanese Application No. 2011-234694 filed Oct. 26, 2011 (with English Translation).
Japanese Office Action issued Mar. 18, 2014 in Japanese Application No. 2011-234694 filed Oct. 26, 2011 (with English Translation).
Extended European Search Report issued Jul. 15, 2015 in Patent Application No. 12844380.1.
Peng Tian, et al., "An Adaptive Bias Configuration Strategy for Range Extension in LTE-Advanced Heterogeneous Networks" Proceedings of ICCTA 2011, XP055081299, Jan. 2011, 5 Pages.

RADIO COMMUNICATION SYSTEM, RADIO BASE STATION, MOBILE COMMUNICATION TERMINAL, AND COMMUNICATION CONTROL METHOD

FIELD OF THE INVENTION

The present invention relates to a radio communication system, a radio base station, a mobile communication terminal, and a communication control method.

BACKGROUND ART

Recently, a heterogeneous network (sometimes abbreviated as "HetNet") is proposed in which multiple types of radio base stations (macro base stations, pico base stations, femto base stations, remote radio heads, etc.) having different transmission powers (transmission capabilities) are deployed in a multi-layered way. In a heterogeneous network, base stations having a higher transmission power (transmission capability), e.g., macro base stations, are likely to be selected by user terminals as the radio access points at the stage of cell search or handover in comparison with other base stations having a lower transmission power, e.g., pico base stations. Accordingly, connections of user terminals are concentrated on base stations with higher transmission power, and thus, there is a tendency for there to be excessive communication load.

RELATED ART DOCUMENTS

Patent Documents

Patent Document 1: JP-A-2007-514367

SUMMARY OF THE INVENTION

Patent Document 1 discloses a technology for changing communication cell boundaries according to the communication environment, such as the load of the radio communication system and the amount of traffic, for controlling access points for user terminals. For example, due to increase in interfering power to user terminals connected to the macro-cell base station from the micro-cell base station, the communication cell boundary (cell range) of the micro-cell base station is narrowed. More specifically, it is exemplified that each user terminal subtracts a predetermined offset (bias value) from the transmission power of the micro-cell base station when the interfering power increases. However, even in the same communication environment for user terminals, there is a possibility that suitable cell ranges for user terminals may vary depending on functions of the user terminals.

Accordingly, it is an object of the present invention to enable each of the user terminals to suitably select its radio access points by setting a suitable cell range depending on the user terminal's function in a radio communication system including multiple types of radio base stations having different transmission powers (transmission capabilities).

According to the present invention, a radio communication system includes: multiple radio base stations including a first radio base station and a second radio base station of which transmission power for radio waves is less than that of the first radio base station; multiple mobile communication terminals including a first mobile communication terminal that can execute interference rejection combining and a second mobile communication terminal that cannot execute interference rejection combining, each mobile communication terminal executing radio communication with any one of the radio base stations by transmitting and receiving radio waves; and an access point selector configured to select a radio base station as a radio access point for each of the mobile communication terminals. The first mobile communication terminal includes a terminal capability information reporter configured to report, to the first radio base station, terminal capability information that includes information indicating that the first mobile communication terminal can execute interference rejection combining. The second mobile communication terminal includes a terminal capability information reporter configured to report, to the first radio base station, terminal capability information that does not include information indicating that the second mobile communication terminal can execute interference rejection combining. The first radio base station includes: a determiner configured to determine whether a mobile communication terminal is the first mobile communication terminal or the second mobile communication terminal on the basis of the terminal capability information reported from the mobile communication terminal; a bias value setter configured to set a first bias value as a bias value for the first mobile communication terminal on the basis of determination by the determiner; and a bias value informant configured to transmit the first bias value to the first mobile communication terminal. Each of the first mobile communication terminal and the second mobile communication terminal includes a reception quality measurer configured to measure a reception quality of the radio waves received from the first radio base station to obtain a first reception quality value, and configured to measure a reception quality of the radio waves received from the second radio base station to obtain a second reception quality value. The first mobile communication terminal includes: a reception quality compensator configured to offset the second reception quality value by increasing the second reception quality value by using the first bias value transmitted by the bias value informant of the first radio base station; and a reception quality reporter configured to report, to the access point selector, the first reception quality value obtained by the reception quality measurer and the second reception quality value that is offset by the reception quality compensator. The second mobile communication terminal includes: a reception quality compensator configured to offset the second reception quality value by increasing the second reception quality value by using a second bias value that is lower than the first bias value; and a reception quality reporter configured to report, to the access point selector, the first reception quality value obtained by the reception quality measurer and the second reception quality value that is offset by the reception quality compensator. The access point selector is configured to select, as a radio access point for a mobile communication terminal, a radio base station corresponding to a reception quality value indicating a best reception quality among the first reception quality value and the second reception quality value reported by the reception quality reporter of the mobile communication terminal.

In the above-described structure, "offset . . . reception quality value . . . by using . . . bias value" is meant to include "offset . . . reception quality value . . . by using . . . bias value that is zero". That is to say, it is meant to include no offsetting of the reception quality value. Since the second bias value is lower than the first bias value, the value zero may be only the second bias value.

With such a structure, on the basis of the first reception quality value of radio waves received from the first radio base station and the second reception quality value that was offset by using the bias value decided depending on whether or not the mobile communication terminal can execute interference rejection combining, the access point selector selects the radio base station to which the mobile communication terminal is connected. Therefore, in comparison with another structure in which the second reception quality value is not offset with the bias value, it is possible to increase opportunities for the second radio base station to be selected as the radio access points for mobile communication terminals (opportunities for mobile communication terminals to be offloaded to the second radio base station).

In addition, since the first bias value used for the first mobile communication terminal that can execute interference rejection combining is in excess of the second bias value for the second mobile communication terminal that cannot execute interference rejection combining, it is possible to increase opportunities for the second radio base station to be selected as the radio access point for the first mobile communication terminal.

In a preferred embodiment of the present invention, the bias value setter of the first radio base station is configured to set, as a bias value for the second mobile communication terminal, the second bias value that is lower than the first bias value on the basis of determination by the determiner. The bias value informant of the first radio base station is configured to transmit the second bias value to the second mobile communication terminal. The reception quality compensator of the second mobile communication terminal is configured to offset the second reception quality value by using the second bias value transmitted by the bias value informant of the first radio base station.

With such a structure, the first radio base station sets and transmits not only the first bias value, but also the second bias value.

In a preferred embodiment of the present invention, the bias value setter of the first radio base station is configured to set the first bias value for the first mobile communication terminal by adding a predetermined value to the second bias value for the second mobile communication terminal.

With such a structure, upon deciding the second bias value, the first bias value is decided. Therefore, it is unnecessary to set the first bias value individually, so that the structure may be simplified.

In a preferred embodiment of the present invention, the bias value setter of the first radio base station is configured to set the first bias value for each of multiple first mobile communication terminals in accordance with a success rate of radio communication at the first mobile communication terminal.

With such a structure, the first bias value is decided appropriately in accordance with a success rate of radio communication.

In a preferred embodiment of the present invention, the first radio base station includes the access point selector.

With such a structure, the first radio base station can select the radio access points for mobile communication terminals.

In a preferred embodiment of the present invention, each of the first mobile communication terminal and the second mobile communication terminal includes the access point selector.

With such a structure, each mobile communication terminal can select the radio access point for the mobile communication terminal itself.

According to the present invention, a radio base station is a first radio base station in a radio communication system including multiple radio base stations including the first radio base station and a second radio base station of which transmission power for radio waves is less than that of the first radio base station, and multiple mobile communication terminals including a first mobile communication terminal that can execute interference rejection combining and a second mobile communication terminal that cannot execute interference rejection combining, each mobile communication terminal executing radio communication with any one of the radio base stations by transmitting and receiving radio waves. The first radio base station includes: a determiner configured to determine whether a mobile communication terminal is the first mobile communication terminal or the second mobile communication terminal on the basis of terminal capability information of the mobile communication terminal reported from the mobile communication terminal; a bias value setter configured to set a first bias value as a bias value for the first mobile communication terminal on the basis of determination by the determiner; and a bias value informant configured to transmit the first bias value to the first mobile communication terminal, the first bias value being to be used for compensating to increase a reception quality of radio waves received from the second radio base station and measured by the first mobile communication terminal.

In a preferred embodiment of the present invention, the bias value setter of the first radio base station is configured to set, as a bias value for the second mobile communication terminal, the second bias value that is lower than the first bias value on the basis of determination by the determiner. The bias value informant of the first radio base station is configured to transmit the second bias value to the second mobile communication terminal, the second bias value being to be used for compensating to increase a reception quality of radio waves received from the second radio base station and measured by the second mobile communication terminal.

In a preferred embodiment of the present invention, the bias value setter of the first radio base station is configured to set the first bias value for the first mobile communication terminal by adding a predetermined value to the second bias value for the second mobile communication terminal.

In a preferred embodiment of the present invention, the bias value setter of the first radio base station is configured to set the first bias value for each of multiple first mobile communication terminals in accordance with a success rate of radio communication at the first mobile communication terminal.

In a preferred embodiment of the present invention, the radio base station further includes an access point selector configured to select, as a radio access point for each of the first mobile communication terminal and the second mobile communication terminal, a radio base station corresponding to a reception quality value indicating a best reception quality among reception qualities reported by the mobile communication terminal.

According to the present invention, a mobile communication terminal is a first mobile communication terminal in a radio communication system including multiple radio base stations including the first radio base station and a second radio base station of which transmission power for radio waves is less than that of the first radio base station, and multiple mobile communication terminals including a first mobile communication terminal that can execute interference rejection combining and a second mobile communication terminal that cannot execute interference rejection combining, each mobile communication terminal executing radio communication with any one of the radio base stations by transmitting and receiving radio waves. The mobile communication terminal including: a terminal capability information reporter configured to report, to the first radio base station, terminal capability information that includes information indicating that the mobile communication terminal can execute interference rejection combining; and a reception quality measurer configured to measure a reception quality of the radio waves received from the first radio base station to obtain a first reception quality value, and configured to measure a reception quality of the radio waves received from the second radio base station to obtain a second reception quality value.

In a preferred embodiment of the present invention, the mobile communication terminal further includes a reception quality compensator configured to offset the second reception quality value by increasing the second reception quality value by using a bias value transmitted by the first radio base station, the bias value being higher than that for the second mobile communication terminal.

In a preferred embodiment of the present invention, the mobile communication terminal further includes an access point selector configured to select, as a radio access point for the mobile communication terminal, a radio base station corresponding to a reception quality value indicating a best reception quality among the first reception quality value obtained by the reception quality measurer and the second reception quality value that is offset by the reception quality compensator.

According to the present invention, a communication control method is used in a radio communication system including multiple radio base stations including a first radio base station and a second radio base station of which transmission power for radio waves is less than that of the first radio base station, multiple mobile communication terminals including a first mobile communication terminal that can execute interference rejection combining and a second mobile communication terminal that cannot execute interference rejection combining, each mobile communication terminal executing radio communication with any one of the radio base stations by transmitting and receiving radio waves, and an access point selector configured to select a radio base station as a radio access point for each of the mobile communication terminals. The communication control method includes: reporting from the first mobile communication terminal to the first radio base station terminal capability information that includes information indicating that the first mobile communication terminal can execute interference rejection combining; reporting from the second mobile communication terminal to the first radio base station terminal capability information that does not include information indicating that the second mobile communication terminal can execute interference rejection combining; determining, at the first radio base station, a mobile communication terminal is the first mobile communication terminal or the second mobile communication terminal on the basis of the terminal capability information reported from the mobile communication terminal; setting, at the first radio base station, a first bias value as a bias value for the first mobile communication terminal on the basis of determination; transmitting, by the first radio base station, the first bias value to the first mobile communication terminal; measuring, at each of the first mobile communication terminal and the second mobile communication terminal, a reception quality of the radio waves received from the first radio base station to obtain a first reception quality value, and a reception quality of the radio waves received from the second radio base station to obtain a second reception quality value; offsetting, at the first mobile communication terminal, the second reception quality value by increasing the second reception quality value by using the first bias value transmitted by the bias value informant of the first radio base station; reporting, from the first mobile communication terminal to the access point selector, the obtained first reception quality value and the offset second reception quality value; offsetting, at the second mobile communication terminal, the second reception quality value by increasing the second reception quality value by using a second bias value that is lower than the first bias value; reporting, from the second mobile communication terminal to the access point selector, the obtained first reception quality value and the offset second reception quality value; and selecting, at the access point selector, as a radio access point for a mobile communication terminal, a radio base station corresponding to a reception quality value indicating a best reception quality among the first reception quality value and the second reception quality value reported by the mobile communication terminal.

DESCRIPTION OF EMBODIMENTS

Figure 1:
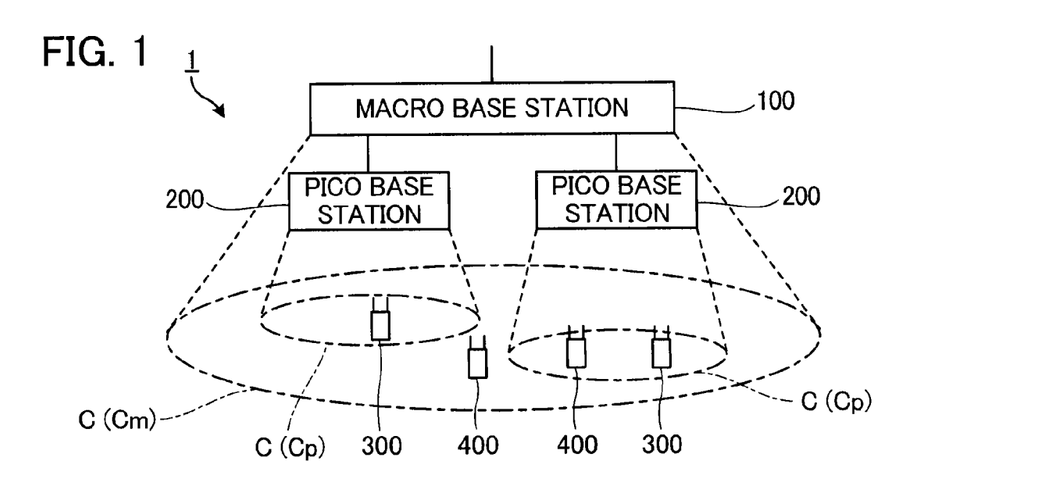
FIG. 1 is a block diagram showing a radio communication system according to an embodiment of the present invention.

FIG. 1 is a block diagram of a radio communication system 1 according to an embodiment of the present invention. The radio communication system 1 comprises a macro base station (macro eNodeB (evolved Node B)) 100, pico base stations (pico eNodeBs) 200, IRC terminals 300 that can execute interference rejection combining (IRC), and non-IRC terminals 400 that cannot execute interference rejection combining. In the description below, each of the IRC terminals 300 and the non-IRC terminals 400 may be referred to as a "user terminal (or user equipment) UE".

Interference rejection combining is a reception technology at user terminals UE discussed in the LTE (Long Term Evolution) Advanced of the 3GPP (Third Generation Partnership Project), and is a technique for downlink communication from a radio base station to user terminals UE, in which the user terminal UE gives weights to signals obtained by reception antennas so as to suppress (reject) interference with the desired radio wave beam from the visited base station (desired base station) caused by interfering radio wave beams from interfering base stations at the user terminal UE. Interference rejection combining is described in, for example, JP-A-2000-511370 and "On advanced UE MMSE receiver modeling in system simulations", R1-111031, 3GPP TSG RAN WG1 Meeting #64, Taipei, Taiwan, 21-25 Feb. 2011, Agenda item: 6.3.1.3, Source: Nokia, Nokia Siemens Networks, Document for Discussion and Decision.

Communication elements in the radio communication system 1 (the macro base station 100, the pico base stations 200, the IRC terminals 300, the non-IRC terminals 400, etc.) conduct radio communication in compliance with a predetermined radio access technology, e.g., LTE. In this embodiment, the radio communication system 1 operates in compliance with LTE, but it is not intended to limit the technical scope of the present invention. The present invention can be used with other radio access technologies with necessary design modifications.

The macro base station 100 is connected to the pico base station 200 via cable or radio. The macro base station 100 forms a macro cell Cm, whereas each pico base station 200 forms a pico-cell Cp. Each pico-cell Cp is a cell C formed within a macro cell Cm formed by the macro base station 100 to which the pico base station 200 that forms the pico-cell Cp is connected. Multiple pico-cell Cp may be formed within a single macro cell Cm.

Each of the radio base stations (the macro base station 100 and the pico base stations 200) can perform radio communication with user terminals UE visiting the cell C of the base station itself In other words, each user terminal UE can perform radio communication with one or more base stations (the macro base station 100 and one of the pico base stations 200, if any) corresponding to one or more cells C (the macro cell Cm and one of the pico-cells Cp, if any) where the user terminal UE itself is visiting.

In comparison with the pico base stations 200, the macro base station 100 has higher radio transmission capabilities (the maximum transmission power, average transmission power, etc) so as to be able to perform radio communication with a farther user terminal UE. Therefore, the macro cell Cm is larger in area than the pico-cells Cp. For example, the radius of the macro cell Cm is from several hundred meters to several tens of kilometers, whereas the radius of the pico-cell Cp is from several meters to several tens of meters.

As will be understood from the above description, the macro base station 100 and the pico base station 200 in the radio communication system 1 constitute a heterogeneous network in which multiple types of radio base stations having different transmission powers (transmission capabilities) are deployed in a multi-layered way (see 3GPP TR 36.814 V9.0.0 (2010-03), 3rd Generation Partnership Project; Technical Specification Group Radio Access Network; Evolved Universal Terrestrial Radio Access (E-UTRA); Further advancements for E-UTRA physical layer aspects (Release 9), in particular, Section 9A "Heterogeneous Deployments").

Since the pico-cells Cp are formed in a multi-layered way (i.e., overlaid) inside the macro cell Cm, when the user terminal UE is visiting the pico-cell Cp, it will be understood that the user terminal UE can perform radio communication with at least one of the pico base stations 200 defining the pico-cells Cp and the macro base station 100 defining the macro cell Cm that includes the pico-cells Cp.

The scheme for radio communication between each base station and each user terminal UE may be freely chosen. For example, OFDMA (Orthogonal Frequency Division Multiple Access) may be adopted for downlink, whereas SC-FDMA (Single-Carrier Frequency Division Multiple Access) may be adopted for uplink.

Figure 2:
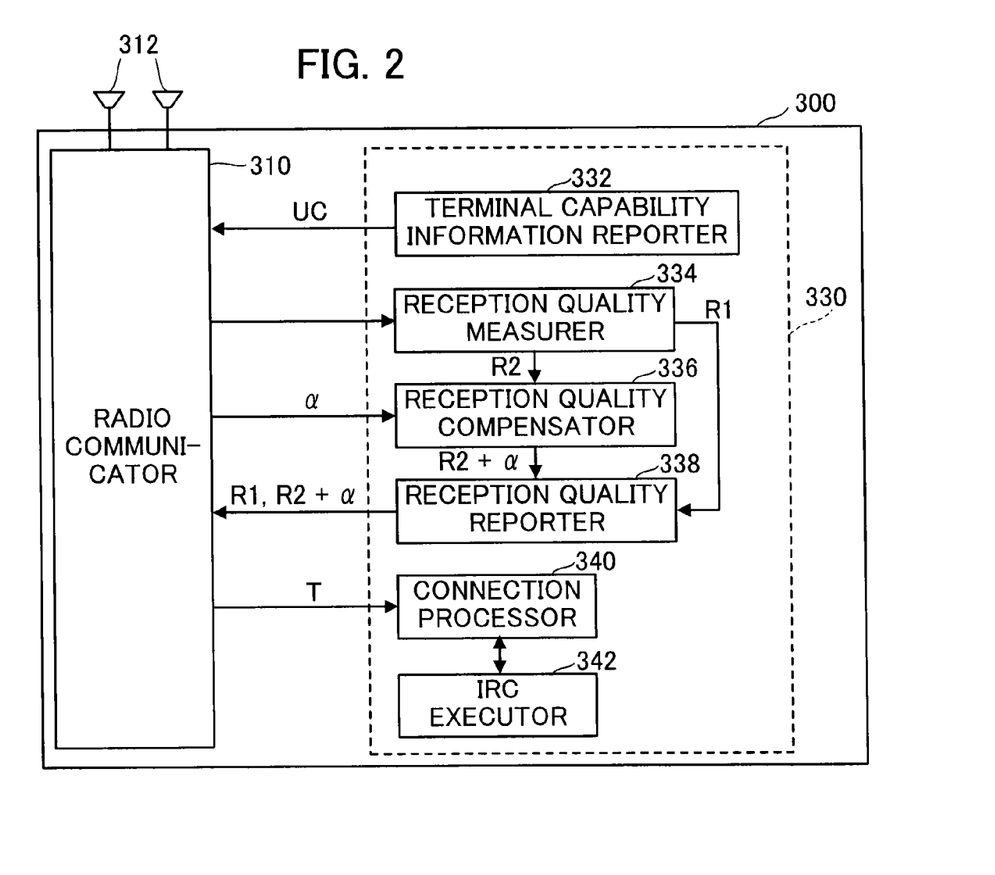
FIG. 2 is a block diagram showing the structure of an IRC terminal according to an embodiment of present invention.

FIG. 2 is a block diagram showing the structure of the IRC terminal 300 according to an embodiment of present invention. The IRC terminal 300 includes a radio communicator 310 and a controller 330. For the purpose of facilitating understanding, output devices for outputting sound, images, etc., and input devices for accepting user instructions, are omitted in FIG. 2.

The radio communicator 310 is an element for executing radio communication with radio base stations (the macro base station 100 and the pico base stations 200), and includes transmission and reception antennas 312, a reception circuit for receiving radio waves from a radio base station and converting them to an electrical signal, and a transmission circuit for converting an electrical signal, such as a voice signal, to radio waves, and sending them. The radio communicator 310 receives a first bias value $\alpha$ and access cell information T from the macro base station 100 forming the macro cell Cm where the IRC terminal 300 is visiting, and transmits terminal capability information (UE capability information) UC and reception power value R to the macro base station 100. Details of operations will be described later.

The controller 330 includes, as its elements, a terminal capability information reporter 332, a reception quality measurer 334, a reception quality compensator 336, a reception quality reporter 338, a connection processor 340, and an IRC executor 342. In downlink communication, the connection processor 340 and the IRC executor 342 cooperate with the radio communicator 310 to execute the above-described interference rejection combining for suppressing the interfering power. Details of other operations of the controller 330 will be described later.

The controller 330 and the terminal capability information reporter 332, the reception quality measurer 334, the reception quality compensator 336, the reception quality reporter 338, the connection processor 340, and the IRC executor 342 within the controller 330 are functional blocks accomplished by the fact that a CPU (central processing unit, not shown) in the IRC terminal 300 executes a computer program stored in a memory (not shown) and operates in accordance with the computer program.

Figure 3:
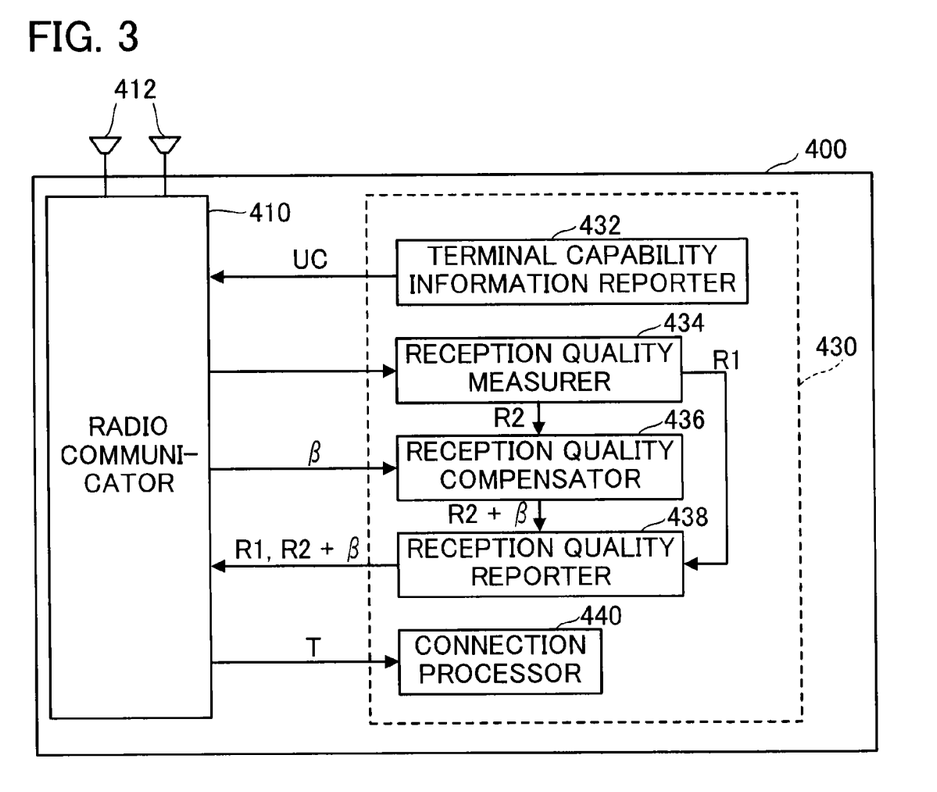
FIG. 3 is a block diagram showing the structure of a non-IRC terminal according to an embodiment of present invention embodiment of according to the present invention.

FIG. 3 is a block diagram showing the structure of the non-IRC terminal 400 according to an embodiment of the present invention. As similar to the IRC terminal 300, the non-IRC terminal 400 includes a radio communicator 410 and the controller 430. In general, the IRC terminal 300 and the non-IRC terminal 400 differ in whether or not there is the IRC executor 342 (i.e., whether or not interference rejection combining can be executed), and the other elements are the same.

The radio communicator 410 receives a second bias value $\beta$ and access cell information T from the macro base station 100 forming the macro cell Cm where the non-IRC terminal 400 is visiting, and transmits terminal capability information (UE capability information) UC and reception power value R to the macro base station 100. The controller 430 includes, as its elements, a terminal capability information reporter 432, a reception quality measurer 434, a reception quality compensator 436, a reception quality reporter 438, and a connection processor 440, but excludes an IRC executor. Details of operations of the radio communicator 410 and the controller 430 will be described later.

Figure 4:
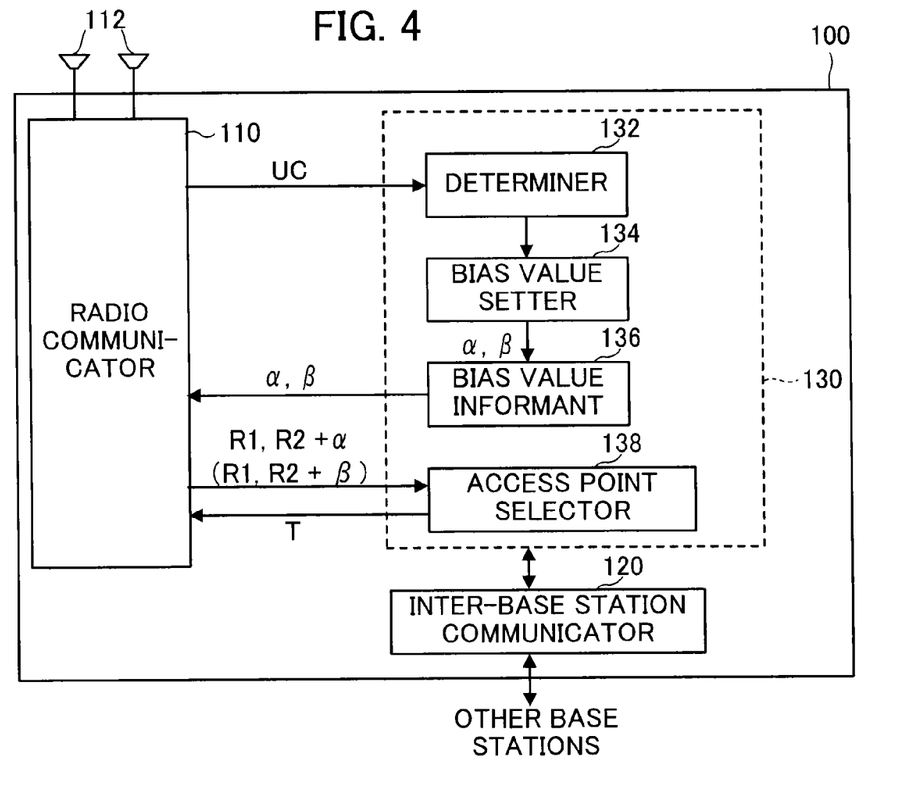
FIG. 4 is a block diagram showing the structure of a macro base station according to an embodiment of the present invention.

FIG. 4 is a block diagram showing the structure of the macro base station 100 according to an embodiment of the present invention. The macro base station 100 includes a radio communicator 110, an inter-base station communicator 120, and a controller 130.

The radio communicator 110 is an element for executing radio communication with user terminals UE, and includes transmission and reception antennas 112, a reception circuit for receiving radio waves from user terminals UE and converting them to an electrical signal, and a transmission circuit for converting an electrical signal, such as a voice signal, to radio waves, and sending them. The radio communicator 110 transmits a radio signal indicating a first bias value α and access cell information T to each IRC terminal 300 that is visiting the macro base station 100, transmits a radio signal indicating a second bias value β and access cell information T to each non-IRC terminal 400 that is visiting to the macro base station 100, and receives a radio signal indicating terminal capability information UC and a reception power value R from each user terminal UE. Details of these operations will be described later.

The inter-base station communicator 120 is an element for executing communication with other radio base stations (other macro base stations 100 and the pico base stations 200), and exchanges electrical signals with other radio base stations. It will be appreciated that in a case in which the macro base station 100 communicates with other radio base stations wirelessly, the radio communicator 110 may be used as the inter-base station communicator 120.

The controller 130 includes, as its elements, a determiner 132, a bias value setter 134, a bias value informant 136, and an access point selector 138. The controller 130 and the determiner 132, the bias value setter 134, the bias value informant 136, and the access point selector 138 within the controller 130 are functional blocks accomplished by the fact that a CPU (not shown) in the macro base station 100 executes a computer program stored in a memory (not shown) and operates in accordance with the computer program. Details of operations of the controller 130 will be described.

Figure 5:
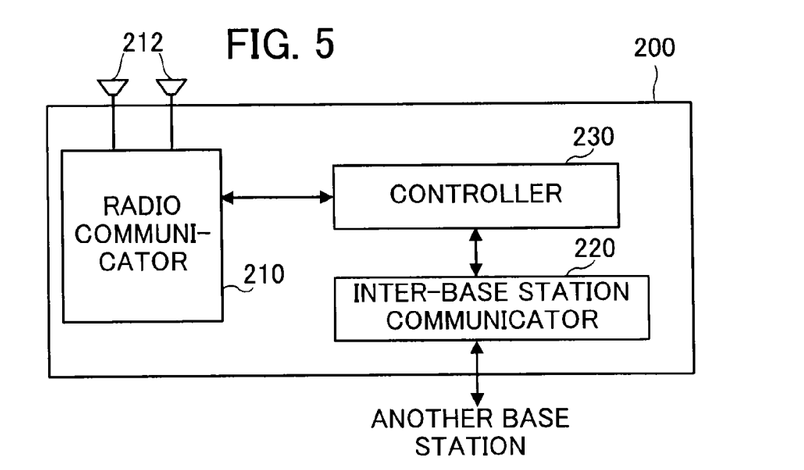
FIG. 5 is a block diagram showing the structure of a pico base station according to an embodiment of the present invention.

FIG. 5 is a block diagram showing the structure of the pico base station 200 according to an embodiment of the present invention. The pico base station 200 includes a radio communicator 210, an inter-base station communicator 220, and a controller 230.

The radio communicator 210 is an element for executing radio communication with user terminals UE, and includes transmission and reception antennas 212, a reception circuit for receiving radio waves from user terminals UE and converting them to an electrical signal, and a transmission circuit for converting an electrical signal, such as a voice signal, to radio waves, and sending them.

The inter-base station communicator 220 is an element for executing communication with the macro base station 100 to which the pico base station 200 itself is connected, and exchanges electrical signals with the macro base station 100. It will be appreciated that in a case in which the pico base station 200 communicates with the macro base station 100 wirelessly, the radio communicator 210 may be used as the inter-base station communicator 220.

The pico base station 200 can receive information items (the offset α or β, the access cell information T, etc.) transmitted from the macro base station 100, and can forward them to the corresponding user terminal UE. The pico base station 200 can also receive information items (the terminal capability information UC, the reception power value R, etc.) transmitted from user terminals UE, and can forward them to the macro base station 100.

More specifically, the controller 230 supplies, to the radio communicator 210, an electrical signal indicating information items (the offset α or β, the access cell information T, etc.) received at the inter-base station communicator 220 of the pico base station 200 from the macro base station 100. The radio communicator 210 converts the supplied electrical signal to radio waves and sends them to the corresponding user terminal UE. In addition, the controller 230 supplies, to the inter-base station communicator 220, an electrical signal indicating the terminal capability information UC, the reception power value R, etc., obtained by reception and conversion at the radio communicator 210 of the pico base station 200. The inter-base station communicator 220 transmits the supplied electrical signal to the macro base station 100. With such a structure, when the user terminal UE is near the pico base station 200 and has difficulty in radio communication with the macro base station 100, necessary information can be exchanged between each user terminal UE and the macro base station 100.

The controller 230 of the pico base station 200 is a functional block accomplished by the fact that a CPU (not shown) in the pico base station 200 executes a computer program stored in a memory (not shown) and operates in accordance with the computer program.

Figure 6:
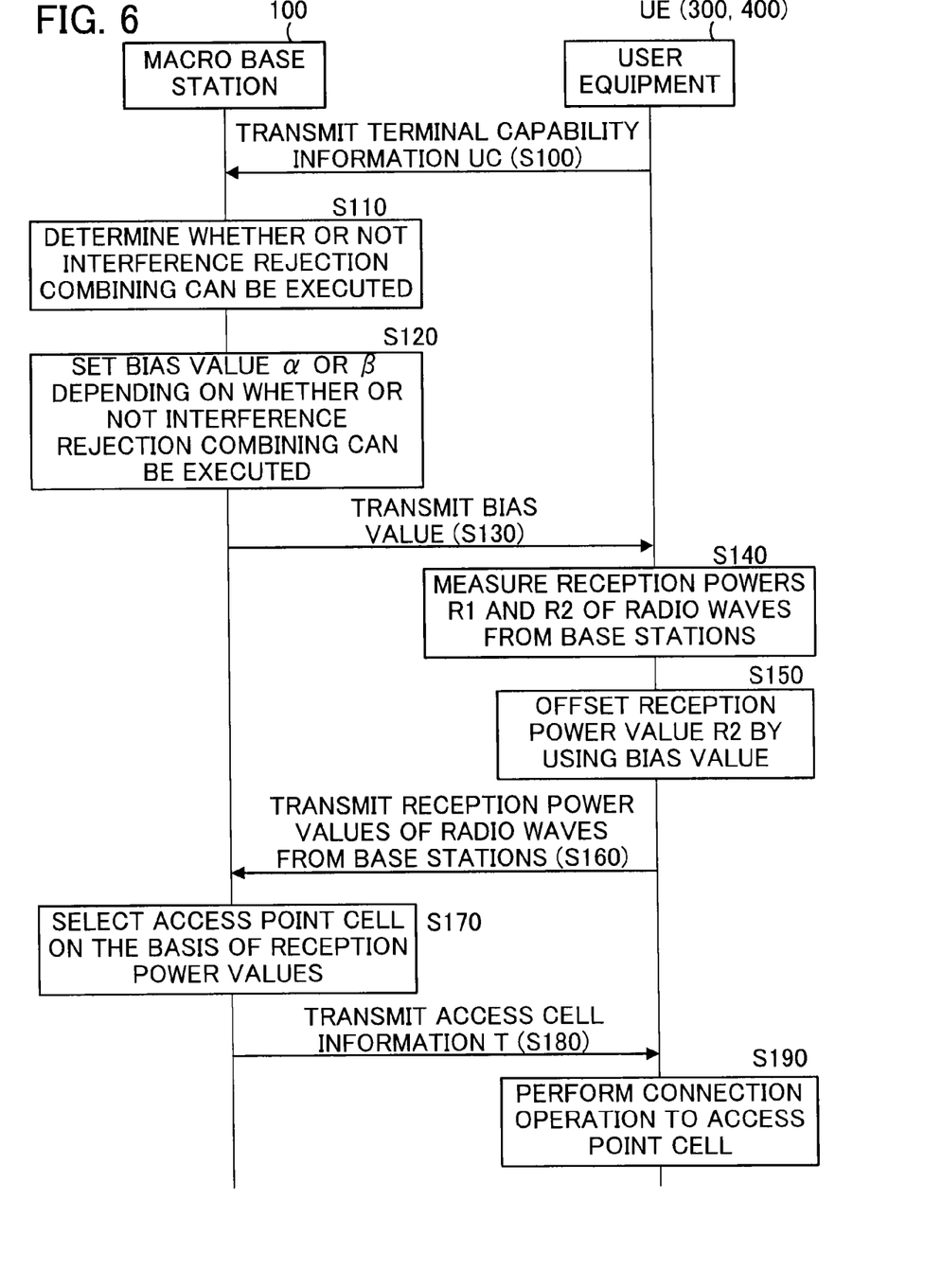
FIG. 6 is a view showing operations for offsetting reception power values in the radio communication system.

With reference to FIG. 6, operations for offsetting reception powers (reception qualities) in the present embodiment will be described. Each user terminal UE sends (transmits) terminal capability information UC to the macro base station 100 to which the user terminal UE is visiting (S100). In a case in which the user terminal UE is an IRC terminal 300, the terminal capability information UC that the terminal capability information reporter 332 sends via the radio communicator 310 includes information indicating that the IRC terminal 300 itself can execute interference rejection combining. More specifically, for example, the terminal capability information reporter 332 sets a bit that indicates whether interference rejection combining can be executed in the uplink control signal corresponding to the terminal capability information UC to "1", which means that interference rejection combining can be executed.

On the other hand, in a case in which the user terminal UE is a non-IRC terminal 400, the terminal capability information UC that the terminal capability information reporter 432 sends via the radio communicator 410 does not include information indicating that the non-IRC terminal 400 itself can execute interference rejection combining. More specifically, for example, the terminal capability information reporter 432 sets the bit that indicates whether interference rejection combining can be executed in the uplink control signal corresponding to the terminal capability information UC to "0" that means that interference rejection combining cannot be executed. If the communication standard with which the non-IRC terminal 400 comply does not include the bit that indicates whether interference rejection combining can be executed (that is to say, if the communication standard does not stipulate about IRC reception), the terminal capability information UC does not contain information as to whether or not interference rejection combining can be executed. Accordingly, in this case, the terminal capability information reporter 432 of the non-IRC terminal 400 simply transmits the terminal capability information UC to the macro base station 100.

On the basis of the terminal capability information UC reported by the user terminal UE, the determiner 132 of the macro base station 100 determines whether or not the user terminal UE is an IRC terminal 300 or a non-IRC terminal 400 (S110). When the terminal capability information UC contains information that the user terminal UE can execute interference rejection combining, the determiner 132 determines that the user terminal UE is an IRC terminal 300. However, when the terminal capability information UC does not contain information that the user terminal UE can execute interference rejection combining, the determiner 132 determines that the user terminal UE is a non-IRC terminal 400. The determination results are conveyed to the bias value setter 134.

On the basis of the determiner 132, the bias value setter 134 of the macro base station 100 sets a first bias value α if the user terminal UE is an IRC terminal 300, and sets a second bias value β if the user terminal UE is a non-IRC terminal 400 (S120). The first bias value α is set higher than the second bias value β (α>β). Advantageous effects of the bias values α and β will be described in more detail.

The bias value informant 136 sends (transmits) the decided first bias value α to the IRC terminal 300 via the radio communicator 110. On the other hand, the bias value informant 136 sends (transmits) the decided second bias value β to the non-IRC terminal 400 via the radio communicator 110 (S130).

The reception quality measurer 334 or 434 of the user terminal UE (300 or 400) measures, as reception qualities of radio waves, a reception power, e.g., the reference signal received power (RSRP) of the radio waves received from the macro base station 100 to obtain a first reception quality value R1, and a reception power of the radio waves received from the pico base station 200 to obtain a second reception quality value R2 (S140).

Figure 9:
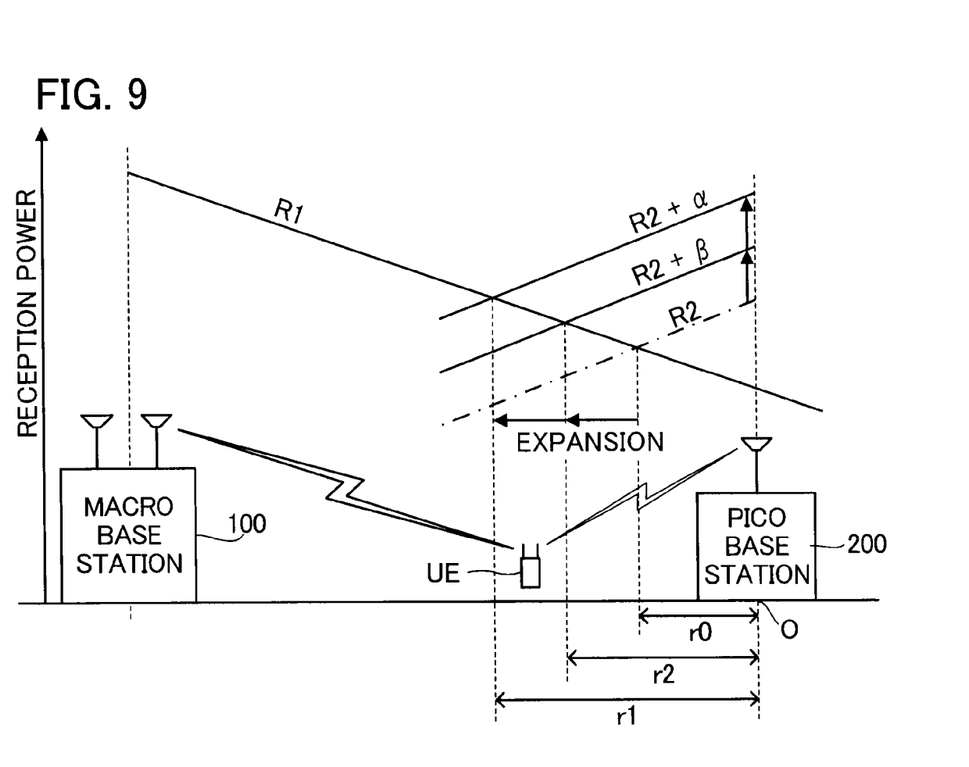
FIG. 9 is a view showing operations for offsetting reception power values according to an embodiment of the present invention.

The reception quality compensator 336 of the IRC terminal 300 offsets reception power value R2 of the radio waves from the pico base station 200 by using the first bias value α transmitted from the bias value informant 136 (S150). More specifically, the reception quality compensator 33 adds the first bias value a to the reception power value R2 of the radio waves from the pico base station 200, so as to obtain the compensated second reception quality value R2+α. In other words, as shown in FIG. 9, the reception quality value R2 of radio waves from the pico base station 200 measured at the IRC terminal 300 is offset by the first bias value α, to be converted to the compensated second reception quality value R2+α.

Similarly, the reception quality compensator 436 of the non-IRC terminal 400 offsets reception power value R2 of the radio waves from the pico base station 200 by using the second bias value β transmitted from the bias value informant 136 (S150). More specifically, in a manner similar to the example of the above-mentioned IRC terminal 300, the compensated second reception quality value R2+β is obtained.

The reception quality reporter 338 of the IRC terminal 300 sends (transmits) the first reception power value R1 and the compensated second reception quality value R2+α to the macro base station 100 via the radio communicator 310 (S160). Similarly, the reception quality reporter 438 of the non-IRC terminal 400 sends (transmits) the first reception power value R1 and the compensated second reception quality value R2+β to the macro base station 100 via the radio communicator 410 (S160). Each pair of the reception power values R1 and R2+α, or R1 and R2+β is supplied to the access point selector 138 via the radio communicator 110.

The access point selector 138 of the macro base station 100 selects, as the radio access point for the user terminal UE, a radio base station (the macro base station 100 or the pico base station 200) corresponding to a reception power value indicating the best reception power (i.e., the best reception quality) among the first reception power value R1 and the second reception power value (R2+α or R2+β) reported from the user terminal UE (IRC terminal 300 or non-IRC terminal 400) (S170).

For example, for the IRC terminal 300, the first reception power value R1 is compared with the second reception quality value R2+α compensated with the first bias value α. In a case in which the compensated second reception quality value R2+α is greater than the first reception power value R1 (R1<R2+α), the access point selector 138 selects the pico base station 200 corresponding to the compensated second reception quality value R2+α as the access point for the IRC terminal 300.

The access point selector 138 transmits the access cell information T indicating the selected radio access point to the user terminal UE via the radio communicator 110 (S180).

At step S190, the connection processor 340 or 440 of the user terminal UE performs connection operation to the access point cell indicated by the access cell information T received from the macro base station 100. If the user terminal UE has already been connected to the access point cell indicated by the access cell information T, the connection processor 340 or 440 maintains the connection. For example, when the user terminal UE is connected to the macro cell Cm, if the connection processor 340 or 440 receives access cell information T designating the pico-cell Cp as the access point, the connection processor 340 or 440 connects (offloads) the user terminal UE itself to the designated pico-cell Cp.

Figure 7:
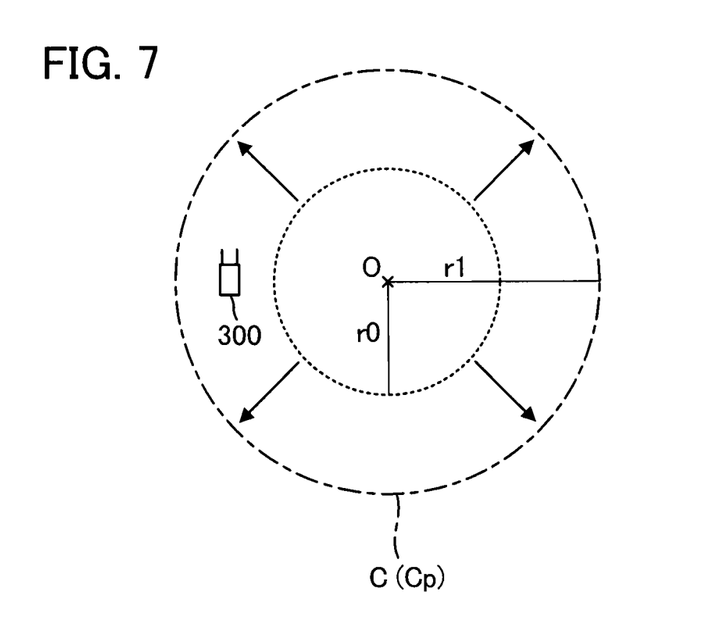
FIG. 7 is a view for showing expansion in the range of the pico-cell from the point of view of the IRC terminal by virtue of the offsetting.
Figure 8:
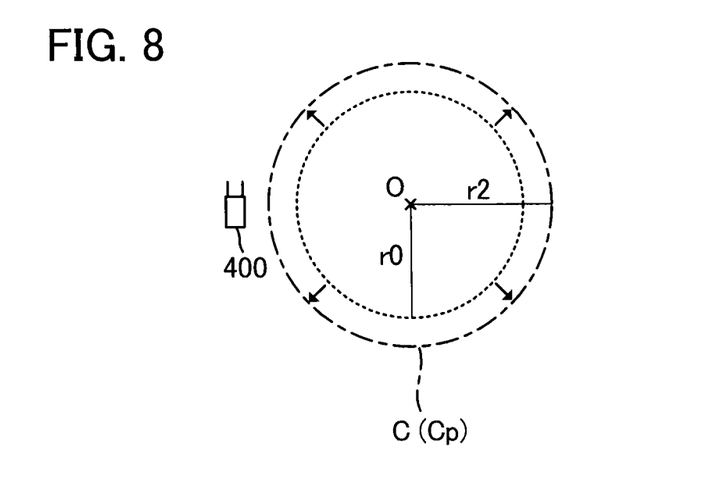
FIG. 8 is a view for showing expansion in the range of the pico-cell from the point of view of the non-IRC terminal by virtue of the offsetting.

FIGS. 7 and 8 are views for showing change in the range of the pico-cell Cp (the range in which the reception power value R2 from the pico base station 200 is greater than the reception power value R1 from the macro base station 100) by virtue of the above-described offsetting. In FIGS. 7 and 8, the original point O is the center point of the pico-cell Cp (i.e., the position at which the pico base station 200 is located within the macro cell Cm), the radius r0 is the radius of the pico-cell Cp in a case in which offsetting with the bias values α and β is not conducted. Let us assume that for FIGS. 7 and 8, the external environment (for example, the transmission power (interfering power) of the macro base station 100) is common, and the type of the user terminal UE is different (the IRC terminal 300 or the non-IRC terminal 400).

In FIG. 7, for the IRC terminal 300, as a result of offsetting the reception power value R2 of the radio waves from the pico base station 200 with the first bias value α, the radius of the pico-cell Cp is expanded from r0 to r1. On the other hand, in FIG. 8, for the non-IRC terminal 400, as a result of offsetting the reception power value R2 of the radio waves from the pico base station 200 with the second bias value β, the radius of the pico-cell Cp is expanded from r0 to r2. In other words, offsetting the reception power value R2 (increase of the reception power value R2 by the bias value α or β) results in pseudo increase in the reception power from the pico base station 200 at each user terminal UE, so as to effect expansion of the range of pico-cell Cp formed by the pico base station 200.

As described above, since the first bias value α is in excess of the second bias value β (α>β), the radius r1 of the pico-cell Cp enlarged by the first bias value α is in excess of the radius r2 of the pico-cell Cp enlarged by the second bias value β.

In addition, as will be appreciated from the foregoing, even if the reception power value R2 of the radio waves from the pico base station 200 is constant, the radius r (r1 and r2) of the pico-cell Cp may vary depending on the user terminal UE.

FIG. 9 is a view for describing the change in the range of the pico-cell Cp described with reference to FIGS. 7 and 8 with influence by the macro base station 100. As described above, the user terminal UE receives radio waves from the macro base station 100 and the pico base station 200, and measures reception powers. As shown in FIG. 9, the farther from a radio base station, the lower the measured reception power value R1 or R2 corresponding to the radio base station.

First, let us assume that a user terminal UE is located in a region defined by the radius r2 around the original point O, but excluding the region defined by the radius r0 around the original point O (i.e., the region of the pico-cell Cp expanded with the second bias value β excluding the region of the pico-cell Cp without expansion). At the user terminal UE, the reception power value R2 from the pico base station 200 is lower than the reception power value R1 from the macro base station 100, whereas the values R2+α or R2 +β obtained by offsetting the reception power value R2 with the first bias value α or the second bias value β is higher than the reception power value R1.

Accordingly, regardless of whether the user terminal UE is an IRC terminal 300 or a non-IRC terminal 400, the access point selector 138 of the macro base station 100 selects the pico base station 200 as the radio access point.

Next, let us assume that a user terminal UE is located in a region defined by the radius r1 around the original point O, but excluding the region defined by the radius r2 around the original point O (i.e., the region of the pico-cell Cp expanded with the first bias value α excluding the region of the pico-cell Cp expanded with the second bias value β). At the user terminal UE, the value R2+α obtained by offsetting the reception power value R2 with the first bias value α is higher than the reception power value R1, whereas the value R2+β obtained by offsetting the reception power value R2 with the second bias value β is lower than the reception power value R1. Accordingly, if the user terminal UE is an IRC terminal 300, the access point selector 138 selects the pico base station 200 as the radio access point, but if the user terminal UE is a non-IRC terminal 400, the access point selector 138 selects the macro base station 100 as the radio access point.

In the above-described region defined by the radius r1 around the original point O, but excluding the region defined by the radius r2 around the original point O, the first reception power value R1 (i.e., interfering power from the macro base station 100) is much higher than the original second reception power value R2 without offsetting. However, since the IRC terminal 300 can execute interference rejection combining for suppressing the interfering power from the macro base station 100, the IRC terminal 300 can receive radio waves from the pico base station 200 with high quality.

On the other hand, since the non-IRC terminal 400 cannot execute interference rejection combining, the non-IRC terminal 400 cannot receive radio waves from the pico base station 200 with high quality. Accordingly, the non-IRC terminal 400 is connected to the macro base station 100 to receive radio waves with high quality from the macro base station 100.

In accordance with the above-described embodiment, on the basis of the reception power value R1 from the macro base station 100 without offsetting and the compensated reception power value R2+α or R2+β from the pico base station 200 offset with the bias value, the access point selector 138 selects the radio base station that the user terminal UE should be connected. Therefore, in comparison with another structure in which the reception power value is not offset with the bias value, it is possible to increase opportunities for the pico base station 200 to be selected as the radio access points for user terminals UE (opportunities for user terminals UE to be offloaded to the pico base station 200).

In addition, since the first bias value α used for the IRC terminals 300 is in excess of the second bias value β for the non-IRC terminals 400, it is possible to increase opportunities for the pico base station 200 to be selected as the access point for the IRC terminals 300. In other words, for the IRC terminals 300, the range of the pico-cell Cp is expanded with the aid of its feature that can execute interference rejection combining. Therefore, connection of the IRC terminals 300 to the pico base station 200 is facilitated, so that concentration of wireless connection on the macro base station 100 can be limited. On the other hand, for non-IRC terminals 400, the range of the pico-cell Cp is set narrower than that for the IRC terminals 300, so that adverse influence by the interfering power from the macro base station 100 is limited and the reception quality of the desired signal can be maintained at a high level.

In other words, since the bias value is set depending on the type of the user terminal UE (the IRC terminal 300 or the non-IRC terminal 400), the effect of offloading to the pico base stations 200 and the maintenance of high quality of the desired signal and user throughput can be achieved in an environment in which multiple types of user terminals UE are mixed.

Variations

Various variations may be applied to the above-described embodiment. Specific variations are exemplified below. Two or more variations selected from among the following may be combined.

(1) Variation 1

Figure 10:
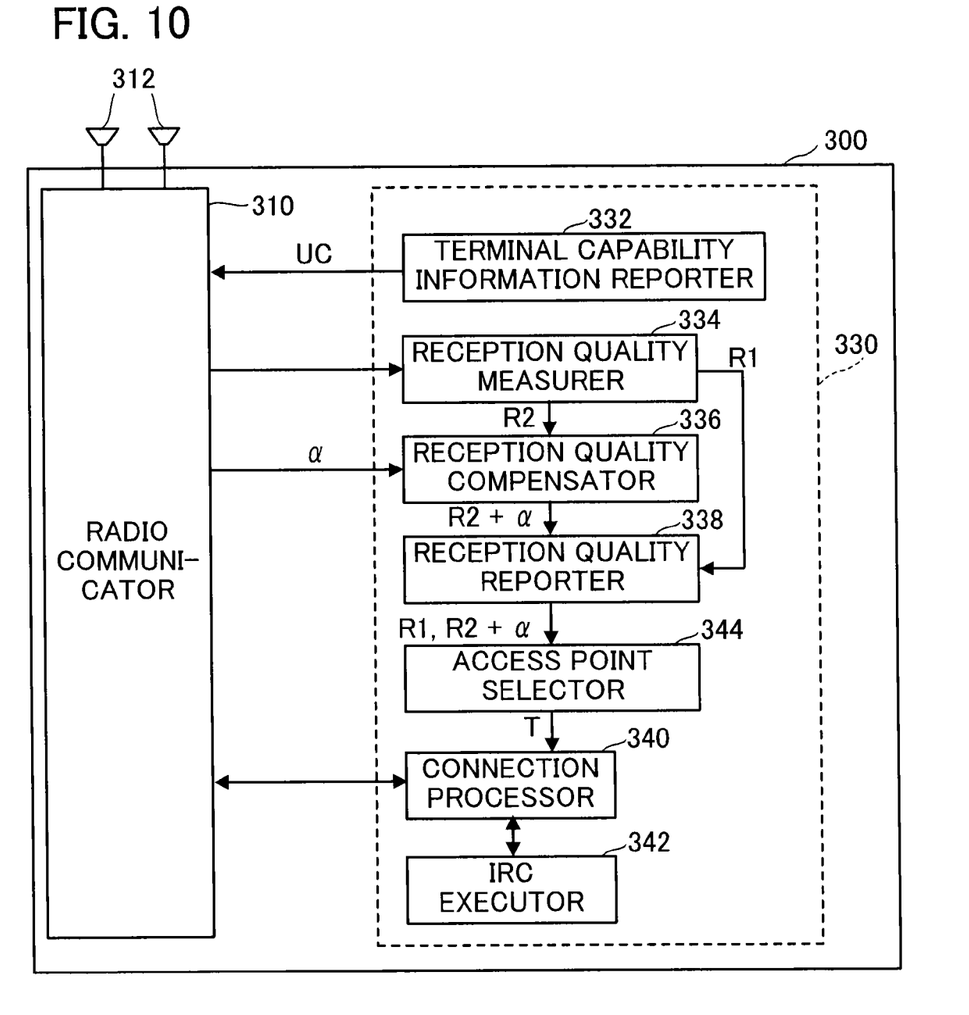
FIG. 10 is a block diagram showing the structure of an IRC terminal according to a variation of the present invention.
Figure 11:
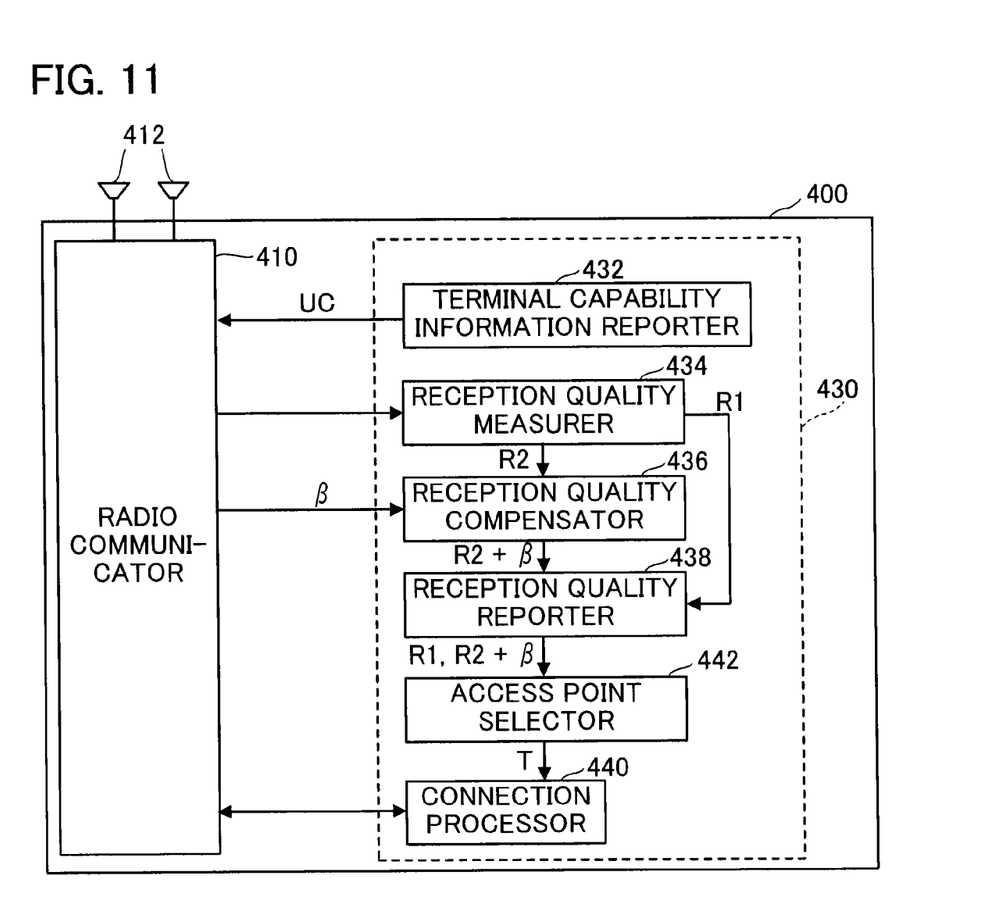
FIG. 11 is a block diagram showing the structure of a non-IRC terminal according to a variation of the present invention.

In the above-described embodiment, the controller 130 of the macro base station 100 includes the access point selector 138. However, as shown in FIGS. 10 and 11, each of the IRC terminal 300 and non-IRC terminal 400 may include an access point selector 344 or 442. In this case, it will be appreciated that the controller 130 of the macro base station 100 does not need to include the access point selector 138.

(2) Variation 2

In the above-described embodiment, the bias value setter 134 of the macro base station 100 sets the second bias value β to a positive value that is not 0 (β>0). However, the bias value setter 134 may set the second bias value β to 0 (β=0).

In addition, the bias value setter 134 may set only the first bias value α without setting the second bias value β. In this case, the bias value informant 136 does not need to transmit the second bias value β to the non-IRC terminal 400, and the non-IRC terminal 400 does not need to offset the second reception power value R2 of radio waves from the pico base station 200. In other words, it is possible to adopt a structure in which only the first bias value α is decided and transmitted, and only IRC terminal 300 offsets the second reception power value R2. With such a structure, since only IRC terminal 300 offsets the second reception power value R2, the structure is simplified.

However, according to the structure of the above-described embodiment in which the second bias value β is set to a positive value that is not 0 and the second reception power value R2 is offset, the likelihood of offloading even the non-IRC terminals 400 to the pico base station 200 is increased.

Accordingly, the above-described embodiment is more preferable in view of restriction of concentration of wireless connection on the macro base station 100.

(3) Variation 3

In the above-described embodiment, the bias value setter 134 of the macro base station 100 sets the first bias value α and the second bias value β individually. In the above-described structure, the bias value setter 134 may set the first bias value α for the IRC terminal 300 depending on the success rate of radio communication at the IRC terminal 300, e.g., Ack/Nack (the rate of Ack to Nack). In particular, in a case in which there are multiple IRC terminals 300, it is preferable that the first bias value α is decided for each individual IRC terminal 300. With such a structure, the first bias value α can be decided appropriately depending on the individual communication environment for each IRC terminal 300.

(4) Variation 4

The bias value setter 134 of the macro base station 100 may set the first bias value α for the non-IRC terminals 400 by adding a predetermined value γ to the second bias value β for the non-IRC terminals 400 (α=β+γ). With such a structure, in comparison with the structure in which the bias value setter 134 sets the first bias value α and the second bias value β individually, the structure is simplified.

(5) Variation 5

In the above-described embodiment, the reference signal received power (RSRP) is used for the reception quality of radio waves. However, the signal-to-interference and noise ratio (SINR), the reference signal received quality, etc., may be used as the reception quality of radio waves. In addition, when the reception quality value is represented as a ratio, the compensated reception quality value may be calculated by multiplying the reception quality value by the bias value.

Furthermore, when the reception quality value is represented as dB (logarithm of a ratio), the compensated reception quality value may be calculated by adding the reception quality value represented in dB by the bias value represented in dB. It will be appreciated that each of these variations is encompassed within an embodiment in which the reception quality value is multiplied by the bias value.

(6) Variation 6

In the above-described embodiment, the pico base stations 200 are exemplified as radio base stations of which transmission capability is lower than that of the macro base station 100. However, as radio base stations with lower transmission capabilities, micro base stations, nano base stations, femto base stations, remote radio heads, etc, may be used. In addition, as elements of the radio communication system 1, a set of multiple types of radio base stations (e.g., macro base stations, pico base stations, and femto base stations) having different transmission capabilities may be adopted.

(7) Variation 7

The user terminals UE (the IRC terminals 300 and the non-IRC terminals 400) may be any type of device that can perform radio communication with each of the radio base stations (the macro base station 100 and the pico base stations 200). The user terminal UE may be a cell phone terminal, e.g., a future phone or a smart phone, a desk-top type personal computer, a laptop personal computer, a UMPC (ultra-mobile personal computer), a portable game machine, or another radio terminal.

(8) Variation 8

In each of elements in the radio communication system 1 (the macro base station 100, the pico base stations 200, and the user terminals UE), functions executed by the CPU may be executed by hardware or a programmable logic device, such as an FPGA (Field Programmable Gate Array) or a DSP (Digital Signal Processor), instead of the CPU.

REFERENCE SYMBOLS

1: Radio Communication System
100: Macro Base Station
110: Radio Communicator
120: Inter-Base Station Communicator
130: Controller
132: Determiner
134: Bias Value Setter
136: Bias Value Informant
138: Access Point Selector
200: Pico Base Station
210: Radio Communicator
220: Inter-Base Station Communicator
230: Controller
300: IRC Terminal
310: Radio Communicator
330: Controller
332: Terminal Capability Information Reporter
334: Reception Quality Measurer
336: Reception Quality Compensator
338: Reception Quality Reporter
340: Connection Processor
342: IRC Executor
400: Non-IRC Terminal
410: Radio Communicator
430: Controller
432: Terminal Capability Information Reporter
434: Reception Quality Measurer
436: Reception Quality Compensator
438: Reception Quality Reporter
440: Connection Processor
α, β: Bias Value
γ: Predetermined Value
C: Cell
Cm: Macro Cell
Cp: Pico-Cell
O: Original Point
R (R1,R2): Reception Power Value
T: Access Cell Information
UC: Terminal Capability Information
UE: User Terminal
r (r0 to r2): Radius

The invention claimed is:

1. A radio communication system comprising:
multiple radio base stations including a first radio base station and a second radio base station of which transmission power for radio waves is less than that of the first radio base station;
multiple mobile communication terminals including a first mobile communication terminal that can execute interference rejection combining and a second mobile communication terminal that cannot execute interference rejection combining, each mobile communication terminal executing radio communication with any one of the radio base stations by transmitting and receiving radio waves; and
an apparatus configured to select a radio base station as a radio access point for each of the mobile communication terminals, wherein
the first mobile communication terminal comprising a first communication interface configured to report, to the first radio base station, terminal capability information that includes information indicating that the first mobile communication terminal can execute interference rejection combining,
the second mobile communication terminal comprising a second communication interface configured to report, to the first radio base station, terminal capability information that does not include information indicating that the second mobile communication terminal can execute interference rejection combining,
the first radio base station comprising:
first circuitry configured to
determine whether a mobile communication terminal is the first mobile communication terminal or the second mobile communication terminal on the basis of the terminal capability information reported from the mobile communication terminal;

set a first bias value as a bias value for the first mobile communication terminal based on a result of the determining; and transmit the first bias value to the first mobile communication terminal, each of the first mobile communication terminal and the second mobile communication terminal comprising respective second and third circuitry configured to measure a reception quality of the radio waves received from the first radio base station to obtain a first reception quality value, and configured to measure a reception quality of the radio waves received from the second radio base station to obtain a second reception quality value, the first mobile communication terminal comprising:

the second circuitry configured to offset the second reception quality value by increasing the second reception quality value by using the first bias value transmitted by the bias value informant of the first radio base station; and report, to the apparatus, the first reception quality value and the offset second reception quality value, the second mobile communication terminal comprising:

the third circuitry configured to offset the second reception quality value by increasing the second reception quality value by using a second bias value that is lower than the first bias value; and report, to the apparatus, the first reception quality value and the offset second reception quality value, wherein the apparatus is configured to select, as a radio access point for a mobile communication terminal, a radio base station corresponding to a reception quality value indicating a best reception quality among the first reception quality value and the second reception quality value reported by the mobile communication terminal.

2. The radio communication system according to claim 1, wherein the first circuitry of the first radio base station is configured to:

set, as a bias value for the second mobile communication terminal, the second bias value that is lower than the first bias value based on a result of the determining; and transmit the second bias value to the second mobile communication terminal, wherein the third circuitry of the second mobile communication terminal is configured to offset the second reception quality value by using the second bias value transmitted by the first radio base station.

3. The radio communication system according to claim 2, wherein the first circuitry of the first radio base station is configured to set the first bias value for the first mobile communication terminal by adding a predetermined value to the second bias value for the second mobile communication terminal.

4. The radio communication system according to claim 1, wherein the first circuitry of the first radio base station is configured to set the first bias value for each of multiple first mobile communication terminals in accordance with a success rate of radio communication at the first mobile communication terminal.

5. The radio communication system according to claim 1, wherein the first radio base station comprises the apparatus.

6. The radio communication system according to claim 1, wherein each of the first mobile communication terminal and the second mobile communication terminal comprises the apparatus.

7. A radio base station that is a first radio base station in a radio communication system comprising multiple radio base stations including the first radio base station and a second radio base station of which transmission power for radio waves is less than that of the first radio base station, and multiple mobile communication terminals including a first mobile communication terminal that can execute interference rejection combining and a second mobile communication terminal that cannot execute interference rejection combining, each mobile communication terminal executing radio communication with any one of the radio base stations by transmitting and receiving radio waves, the first radio base station comprising:

circuitry configured to determine a mobile communication terminal is the first mobile communication terminal or the second mobile communication terminal on the basis of terminal capability information of the mobile communication terminal reported from the mobile communication terminal;

set a first bias value as a bias value for the first mobile communication terminal based on a result of the determining; and transmit the first bias value to the first mobile communication terminal, the first bias value being to be used for compensating to increase a reception quality of radio waves received from the second radio base station and measured by the first mobile communication terminal.

8. The radio base station according to claim 7, wherein the circuitry is configured to:

set, as a bias value for the second mobile communication terminal, the second bias value that is lower than the first bias value based on a result of the determining; and transmit the second bias value to the second mobile communication terminal, the second bias value being to be used for compensating to increase a reception quality of radio waves received from the second radio base station and measured by the second mobile communication terminal.

9. The radio base station according to claim 8, wherein the circuitry is configured to set the first bias value for the first mobile communication terminal by adding a predetermined value to the second bias value for the second mobile communication terminal.

10. The radio base station according to claim 7, wherein the circuitry is configured to set the first bias value for each of multiple first mobile communication terminals in accordance with a success rate of radio communication at the first mobile communication terminal.

11. The radio base station according to claim 7, wherein the circuitry is configured to select, as a radio access point for each of the first mobile communication terminal and the second mobile communication terminal, a radio base station corresponding to a reception quality value indicating a best reception quality among reception qualities reported by the mobile communication terminal.

12. A mobile communication terminal that is a first mobile communication terminal in a radio communication system comprising multiple radio base stations including the first radio base station and a second radio base station of which transmission power for radio waves is less than that of the first radio base station, and multiple mobile communication terminals including a first mobile communication terminal that can execute interference rejection combining and a second mobile communication terminal that cannot execute interference rejection combining, each mobile communication terminal executing radio communication with any one of the radio base stations by transmitting and receiving radio waves, the mobile communication terminal comprising:

circuitry configured to report, to the first radio base station, terminal capability information that includes information indicating that the mobile communication terminal can execute interference rejection combining;

measure a reception quality of the radio waves received from the first radio base station to obtain a first reception quality value;

measure a reception quality of the radio waves received from the second radio base station to obtain a second reception quality value;

offset the second reception quality value by increasing the second reception quality value by using a bias value transmitted by the first radio base station based on a determination at the first radio base station that the mobile communication terminal is the first mobile communication terminal, the bias value being higher than that for the second mobile communication terminal; and transmit the first reception quality value and the offset second reception quality value to an apparatus that selects a radio base station as a radio access point for the mobile communication terminal.

13. The mobile communication terminal according to claim 12, wherein the apparatus is configured to select, as the radio access point for the mobile communication terminal, a radio base station corresponding to a reception quality value indicating a best reception quality among the first reception quality value and the offset second reception quality value.

14. A communication control method used in a radio communication system comprising multiple radio base stations including a first radio base station and a second radio base station of which transmission power for radio waves is less than that of the first radio base station, multiple mobile communication terminals including a first mobile communication terminal that can execute interference rejection combining and a second mobile communication terminal that cannot execute interference rejection combining, each mobile communication terminal executing radio communication with any one of the radio base stations by transmitting and receiving radio waves, and an apparatus configured to select a radio base station as a radio access point for each of the mobile communication terminals, the communication control method comprising:

reporting from the first mobile communication terminal to the first radio base station terminal capability information that includes information indicating that the first mobile communication terminal can execute interference rejection combining;

reporting from the second mobile communication terminal to the first radio base station terminal capability information that does not include information indicating that the second mobile communication terminal can execute interference rejection combining;

determining, at the first radio base station, whether a mobile communication terminal is the first mobile communication terminal or the second mobile communication terminal on the basis of the terminal capability information reported from the mobile communication terminal;

setting, at the first radio base station, a first bias value as a bias value for the first mobile communication terminal on the basis of determination;

transmitting, by the first radio base station, the first bias value to the first mobile communication terminal;

measuring, at each of the first mobile communication terminal and the second mobile communication terminal, a reception quality of the radio waves received from the first radio base station to obtain a first reception quality value, and a reception quality of the radio waves received from the second radio base station to obtain a second reception quality value; offsetting, at the first mobile communication terminal, the second reception quality value by increasing the second reception quality value by using the first bias value transmitted by the bias value informant of the first radio base station; reporting, from the first mobile communication terminal to the apparatus, the obtained first reception quality value and the offset second reception quality value;

offsetting, at the second mobile communication terminal, the second reception quality value by increasing the second reception quality value by using a second bias value that is lower than the first bias value;

reporting, from the second mobile communication terminal to the apparatus, the obtained first reception quality value and the offset second reception quality value; and selecting, at the apparatus, as a radio access point for a mobile communication terminal, a radio base station corresponding to a reception quality value indicating a best reception quality among the first reception quality value and the second reception quality value reported by the mobile communication terminal.

* * * * *